United States Patent [19]

Jacobine et al.

[11] Patent Number: 4,952,711
[45] Date of Patent: Aug. 28, 1990

[54] CROSSLINKING OF (METH) ACRYLOXYALKENYLENE FUNCTIONAL SILOXANE PREPOLYMERS

[75] Inventors: Anthony F. Jacobine, Meriden; Steven T. Nakos, Andover, both of Conn.

[73] Assignee: Loctite Corporation, Newington, Conn.

[21] Appl. No.: 357,053

[22] Filed: May 25, 1989

[51] Int. Cl.$^5$ .............................................. C08F 2/46
[52] U.S. Cl. ................................ 522/99; 522/30; 522/40; 522/46; 522/24; 522/7; 522/44; 522/62
[58] Field of Search .................... 522/99, 24, 30, 7, 40, 522/46, 44, 62

[56] References Cited

U.S. PATENT DOCUMENTS

| | | | |
|---|---|---|---|
| 3,662,022 | 5/1972 | Lard | 260/837 |
| 4,008,341 | 2/1977 | Kohr | 427/44 |
| 4,120,721 | 10/1978 | Ketley | 96/36.3 |
| 4,290,869 | 9/1981 | Pigeon | 204/159.13 |
| 4,477,326 | 10/1984 | Lin | 204/159.13 |
| 4,503,208 | 3/1985 | Lin et al. | 528/15 |
| 4,504,629 | 3/1985 | Lien et al. | 525/288 |
| 4,507,187 | 3/1985 | Jacobine et al. | 204/159.13 |
| 4,533,422 | 8/1985 | Litke | 156/307.3 |
| 4,534,838 | 8/1985 | Lin et al. | 204/159.13 |
| 4,575,545 | 3/1986 | Nakos et al. | 526/242 |
| 4,575,546 | 3/1986 | Klemarczyk et al. | 526/245 |
| 4,587,276 | 5/1986 | Lien et al. | 522/34 |
| 4,595,471 | 6/1986 | Preiner et al. | 522/29 |
| 4,604,295 | 8/1986 | Humphreys | 427/54.1 |
| 4,666,953 | 5/1987 | Klemarczyk et al. | 522/34 |
| 4,699,802 | 10/1987 | Nakos et al. | 427/54.1 |
| 4,760,122 | 7/1988 | Nakos et al. | 526/242 |
| 4,808,638 | 2/1989 | Steinkraus et al. | 522/24 |

FOREIGN PATENT DOCUMENTS 156493 2/1985 European Pat. Off. .
273565 6/1988 European Pat. Off. .

OTHER PUBLICATIONS

C. R. Morgan et al., "Thiol/ene Photocurable Polymers", Journal of Polymer Science: Polymer Chemistry Ed., vol. 15, (1977), pp. 627–645.

Hoyle, Ed, Radiation Curing of Polymeric Materials ACS Symposium 197th National Meeting of the ACS, Dallas, Tex., Apr. 9–14, 1989.

"Thiol/Acrylate Hyrid Systems in Radiation-Curable Coatings—Best of Both Worlds", Cush et al.; NPCA Chemical Coatings Conference II, 5/10/78.

"Ultraviolet Curable Silicone Elastomer Useful as Optical Fiber Coating" Joseph Clark et al; Dow Corning Corporation Presentation.

"Chemistry and Applications of Radiation Curable Silicones", P. J. Varaprath et al.; Rad Tech Proceedings, Apr. 1988, RadTech International, Northbrook, Ill. (pp. 16–30).

Primary Examiner—Melvyn I. Marquis
Attorney, Agent, or Firm—Vidas & Arrett

[57] ABSTRACT

A composition curable to a solid crosslinked polyorganosiloxane comprises:
(a) an acrylic functional silicone prepolymer having a plurality of acrylic groups of the formula:

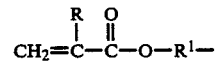

bound to silicon atoms thereof, where R is H or methyl, and $R^1$ is a divalent olefinically unsaturated hydrocarbon group,
(b) a silicone prepolymer having a plurality of organothiol groups thereon, and
(c) an effective amount of a thiol-ene cure catalyst.

Particularly preferred formulations are photoinitiated formulations employing alkylthiol functional silicones in which the total number of thiol groups is between 0.5 and 1.5 times the total number of ene groups counting both the acrylic and the linking group $R^1$ as ene groups.

19 Claims, No Drawings

CROSSLINKING OF (METH) ACRYLOXYALKENYLENE FUNCTIONAL SILOXANE PREPOLYMERS

BACKGROUND OF THE INVENTION

Curable formulations for adhesive, coating, molding and potting applications based on thiol-ene chemistry are well known. A detailed discussion of the general background art in this field may be found in U.S. Pat. 4,808,638 and in the cited references thereto.

This invention relates to a particular subgroup of thiolene formulations in which the thiol and ene are both silicones and the ene resin is an acrylic group.

As used herein, the term "silicone" is used in its conventional sense to refer to polyorganosiloxane polymers. Typically the organo groups are alkyl, aryl, or haloalkyl. Examples of such groups include methyl, ethyl, phenyl and trifluropropyl. Other organo groups may also be present. The term "(meth)acryl" is used generally to refer to both acryl and methacryl functional groups. The term "acrylic" is used generally to refer to both acrylate and methacrylate groups unless the context indicates otherwise.

Thiol-ene formulations employing organo acrylic ene compounds are described in U.S. Pat. 4,008,341; U.S. 4,120,721 and in Gush et al, "Thiol/Acrylate Hybrid Systems in Radiation-Curable Coatings—The Best of Both Worlds", presented at the NPCA Chemical Coatings Conference II, Cincinnati, Ohio, May 10, 1978.

Curable (meth)acryloxy or (meth)acrylamide functional silicone formulations which also employ organothiol functional silicones, as radical chain transfer agents or for thiol-ene co-curing, are described in US 4,290,869; US 4,595,471; and EP 273,565. None of these references describe formulations which utilize alkenylene linking groups between the (meth)acrylic functional group and the silicone backbone.

In U.S. 4,503,208, 4,504,629, 4,575,545, 4,575,546 and 4,760,122 all of which are incorporated here in by reference, the preparation of (meth)acryloxyalkenylene functional silicones is described. Such silicones have a plurality of groups of the formula:

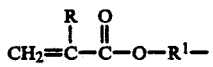

attached to silicon atoms thereof where R is H or methyl, and $R^1$ is a divalent olefinically unsaturated hydrocarbon group. These references do not describe or suggest curing the resins by thiolene addition reactions.

Researchers at Dow Corning Company, a company which has extensively investigated thiol-ene curing of vinyl silicones, have also reported that vinyl functional silicones cured by the thiol-ene reaction display much poorer thermal stability properties compared to the properties of vinyl silicones cured without polythiol. This result has been explained as "undoubtedly a result of the monosulfide crosslink." Clark, et al, "Ultraviolet Curable Silicone Elastomer Useful as Optical Fiber Coating", *Polym. Mater. Sci. Eng.*, 1985, 52 442-47. Other Dow Corning Company researchers have also recently reported "mercapto-olefin functional siloxanes crosslink extremely fast by radiation and curing is not inhibited by oxygen. These systems, however, have several inherent drawbacks such as obnoxious odor and thermal instability" (emphasis added). P.J. Varaparth, et al., RadTech Proceedings, RadTech International, Northbrook, Illinois, pp 16–29 - 16–38 (April 1988).

SUMMARY OF THE INVENTION

A composition cureable to a solid crosslinked polyorganosiloxane comprises:

(a) an acrylic functional silicone prepolymer having a plurality of acrylic groups of the formula:

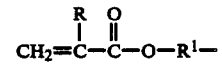

bound to silicon atoms thereof, where R is H or methyl, and $R^1$ is a divalent olefinically unsaturated hydrocarbon group, (b) a silicone prepolymer having a plurality of organothiol groups thereon, and (c) an effective amount of a thiol-ene cure catalyst.

Particularly preferred formulations are free radically cured photoinitiated formulations employing alkylthiol functional silicones.

Preferred formulations contain between 0.5:1 and 1.5:1 thiol groups per reactive ene group, counting both the terminal acrylic and the alkenylene linking groups as reactive ene groups. Surprisingly, the alkenylene linking groups apparently are not only completely reactive to thiol additions under ordinary curing conditions, but the resulting cured polymers display improved thermal properties compared to cured formulations which employ the same unsaturated acrylic silicone without thiol. This improvement increases with thiol content at least up to stoichiometric levels of ene and thiol. At the same time, conventional benefits of thiol crosslinking, including lack of air inhibition and fast cure are also realized.

DETAILED DESCRIPTION OF THE INVENTION

The (meth)acryloxyalkenylene functional silicones used in the formulations of the present invention are prepared by hydrosilating an acrylic ester of an acetylenic alcohol with a SiH functional compound.

SiH functional organosiloxane polymers can be used to directly hydrosilate the acetylenic (meth)acrylate compound. Suitable procedures may be found in examples 1-3 of U.S. 4,503,208. However, it will generally be more convenient to use SiH functional silanes which also contain hydrolyzable functionality to prepare (meth)acryloxyalkenylene functional silanes which also include one, two or three hydrolyzable groups bound to the silicon atom thereof. Such (meth)acryloxyalkenylene functional silanes may be represented by the formula:

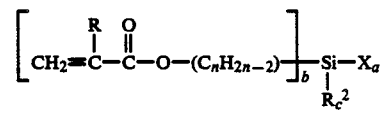

where n is an integer of 3-15, preferably 3-5, a is 1-3, b is 1-3, c is 0-2, and a+b+c=4, X is a hydrolyzable group and $R^2$ is a hydrocarbyl or halOhydrocarbyl group. Suitably, $R^2$ is a $C_1$-$C_8$ group although larger groups may also be employed.

Such (meth)acryloxyalkylene functional silane compounds serve as useful monomers or capping agents for organosiloxane polymers whose molecular sizes, extent of branching and distribution of functional groups may be designed to provide specific desirable properties in the resulting (meth)acryloxyalkenylene functional prepolymer or in a cured polymer thereof. Examples of suitable hydrolyzable groups include chloro, methoxy, ethoxy, oxime such as methyl ethyl ketoximino, acetoxy, N,N-dialkylamino, and other hydrolyzable groups described in U.S. Pat. 4,699,802. For most organosiloxane polymerization or capping reactions methoxy or chloro groups will be satisfactory. Suitable $R^2$ groups are alkyl, aryl and haloalkyl groups. Examples of suitable procedures for producing and using such silanes to produce acrylic functional silicones may be found in US patents 4,503,208 (Example 4), 4,504,629, 4,575,545, 4,575,546 and 4,760,122.

The invention will be described and exemplified below primarily with respect to the preferred bis-((meth)acryloxy)propenyl terminated polydimethylsiloxanes. However, it will be readily seen that similar results may be obtained using other (meth)acryloxyalkenylene functional silicones. In particular, cluster acrylic silicones described in US 4,575,545, 4,575,546 and 4,760,122 may also be usefully employed. Moreover it will be appreciated that modifications of the materials and conditions exemplified herein may readily be made by those skilled in the art without departing from the invention hereof which is set forth in the claims hereof.,.

The thiol-ene compositions of the invention preferably comprise:

a (meth)acryloxyalkenylene terminated polydimethylsiloxane polymer of the formula:

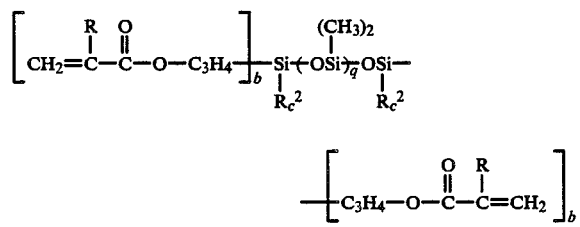

where $R^2$ is preferably methyl, $b+c=3$, b is preferably 1, c is preferably 2, and q is from 100-1500, suitably 250-750, most preferably about 380;

an equivalent weight amount of organosiloxane compounds having plural alkylthiol functionality, at least 20 percent, suitably up to 100%, of said alkythiol groups coming from compounds of the formula:

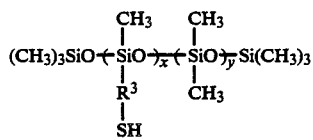

where $R^3$ is lower alkylene, preferably $C_1$-$C_8$ alkylene, most suitably ethylene; x is 3-10, preferably 4-7, most suitably about 5; and y is 25-50, preferably 28-36, most suitably about 30; and, an initiator of thiol-ene addition reactions, suitably a free radical photoinitiator. An "equivalent weight amount" of the alkylthiol functional compounds is an amount sufficient to supply the composition with a number of alkylthiol groups which is approximately equal to the total of the number of (meth)acryl groups and the number of propenylene groups in the composition.

The preferred (meth)acryloxypropenylene terminated silicones are suitably prepared by hydrosilation of propargyl (meth)acrylate with a silane such as dimethylchlorosilane or dimethylmethoxysilane and then using the resulting (meth)acryloxypropenylene functional silane to cap a silanol terminated polydimethylsiloxane of desired molecular weight. The propenylene groups obtained by this method are mixtures of linear (endo) and branched (exo) isomers with the exo isomer:

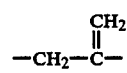

predominating. Suitably the exo isomer comprises at least 70% of the propenylene groups.

Hydrosilation catalysts are well known to those skilled in the art. Examples are platinum, chloroplatinic acid, hydrocarbon platinum complexes, rhodium complexes, etc. Platinum based catalysts, such as Karstedt catalyst and chloroplatinic acid, are preferred at levels of between 10 ppm and 500 ppm platinum, more preferably between 50 ppm and 300 ppm. The reactions can be carried out neat or in solvents which do not interfere with hydrosilations. Toluene, hexane, tetrahydrofuran, methylene chloride and benzene are examples of suitable organic solvents. The hydrosilation reactions can be followed by observing the disappearance of the SiH absorption peak at 2200cm$^{-1}$ of the infrared spectrum. Normally the reactions are complete within three hours.

When cured elastomers having high elongation and low durometer values are desired, inclusion of a dithiol functional silicone as part of the polythiol component allows such properties to be obtained from much lower viscosity formulations. This reduces the need for high molecular weight, high viscosity components which exacerbate formulation and application difficulties. Suitably the dithiol is a compound of the formula:

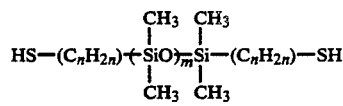

where m is between 1 and 3, preferably about 1, and n is 3-15, preferably 3 or 4.

An example of such a dithiol chain extender is 1,3-bis(3-mercaptopropyl)-1,1,3,3-tetramethyldisiloxane, which may be prepared by a modification of a typical 3-mercaptopropyltrimethoxysilane synthesis. 1,3-Bis(3-chloropropyl)-1,1,3,3-tetramethyldisiloxane may be reacted with thiourea and ammonia to give the aforementioned product.

Best results are obtained when the total thiol functionality and total ene functionality in the formulation are approximately equal. Good results are obtained when the ratio of ene to thiol is in the range of 0.5:1 to 1:1.5 and satisfactory results can be achieved at ratios above or below this range in some cases.

The initiator used in the cureable thiol-ene formulations is suitably a free radical photoinitiator. Examples of free radical photoinitiators include benzoin and substituted benzoin compounds, benzophenone, Michler's ketone, dialkoxybenzophenones, dialkoxyacetophenones, peroxyesters described in U.S. 4,616,826 and 4,604,295, etc. Photosensitizers made compatible with silicones by binding photoinitiating groups to organosiloxane polymer backbones, such as the compounds disclosed in U.S. Pat. Nos. 4,477,326, 4,507,187, 4,587,276, 4,534,838 and 4,666,953, may also be used. Alternatively, thermal free radical initiators such as peroxy or azonitrile initiators can be used to cure the formulations.

Combinations of organic peroxides and certain $\eta^5,\eta^6$-iron arene complex compounds as described in U.S. 4,808,638, incorporated herein by reference, may also be employed as photoinitiators.

Typically the cureable formulations of the invention will also include one or more fillers. Suitable fillers are reinforcing glass fiber or silica fillers. Particularly preferred are fumed silicas, especially fumed silicas which have been treated to render them hydrophobic. Such silicas can be added at high levels, sometimes 60% or more, while maintaining practical viscosities. Especially preferred are silicas treated to give low thixotropic ratios such as Wacker-Chemie HDK-2000 ™. For most applications such fillers will desirably be employed at levels between about 1% and 60%, suitably between about 10% and 40%.

Inert or semi-reinforcing fillers may also be employed such as ground quartz, calcium carbonate, talc, clay and their treated counterparts, as well as other materials well known in the art. Levels of such fillers, when used, are typically 5%–60% based on the total weight of the formulation.

The invention is illustrated by the following non-limiting examples.

EXAMPLE 1

An acryloxypropeny terminated silicone was prepared by capping Rhone Poulenc 48V 750, a bis-hydroxyl terminated polydimethylsiloxane of about 12,000 MW, with acryloxypropenyldimethylchlorosilane. This product was designated "12A:".

A second acryloxypropenyl terminated silicone was prepared as above except that a 28000 MW bis-hydroxyl terminated polydimethylsiloxane was used. This product I7 was designated "28A:".

A third acryloxypropenyl terminated silicone was prepared as described above except that the bis-hydroxyl terminated silicone was Mobay CO.7, a 700 cps silicone fluid. This product was designated "MobA:".

Each of these acrylic functional silicones was mixed with a 3000 MW polydimethylsiloxane having an average of 5 mercaptopropyl groups per molecule in the ratios indicated in table 1 below where the total ene ratio counts both the acrylic and propenylene functional groups whereas the acrylic ene ratio counts only the acrylic groups.

The formulations also included 2% diethoxyacetophenone as photoinitiator. Samples, 70 mil thick, of the formulations were cured by irradiating with 70 mW/cm$^2$ UV for 60 sec/side. Table 1 shows the results of Shore A durometer, extractables and surface cure observations on the cured products. The durometer readings were taken per ASTM procedures. The extractables were determined by 24 hour continuous reflux extraction with hexane, followed by vacuum drying at ~5mm for 3 hours at 60.C. The results demonstrate that at all levels measured the thiol has a positive effect on both crosslink density and surface cure relative to the thiol free formulations, and that crosslink density continues to increase even after the number of thiol groups exceed the number of acrylic groups. Crosslink density begins to fall off, however, after the number of thiol groups exceed the total number of ene groups.

TABLE I

| Formulation | Acrylic Resin | ENE/THIOL RATIO Acrylic Only | ENE/THIOL RATIO Total 'ene | Durometer | % Extractables | Surface Cure |
|---|---|---|---|---|---|---|
| A | 12A: | 1/0 | 1/0 | 16 | 8.0 | Slight tack |
| B | 12A: | 1/1 | 1/0.5 | 19 | 7.4 | Dry |
| C | 12A: | 1/1.5 | 1/0.75 | 22 | 6.3 | Dry |
| D | 12A: | 1/2 | 1/1 | 25 | 6.4 | Dry |
| E | 28A: | 1/0 | 1/0 | 15 | 6.9 | Tacky |
| F | 28A: | 1/2 | 1/1 | 19 | 6.1 | Dry |
| G | MobA: | 1/0 | 1/0 | 7 | 12.7 | Slight tack |
| H | MobA: | 1/0.2 | 1/0.1 | 8 | 11.6 | Slight tack |
| I | MobA: | 1/0.4 | 1/0.2 | 8 | 11.3 | Slight tack |
| J | MobA: | 1/0.7 | 1/0.35 | 9 | 10.5 | Slight tack |
| K | MobA: | 1/1 | 1/0.5 | 11 | 9.0 | Dry |
| L | MobA: | 1/2 | 1/1 | 15 | 9.1 | Dry |
| M | MobA: | 1/3 | 1/1.5 | 13 | 8.5 | Dry |

EXAMPLE 2

A methacryloxypropenyl terminated silicone was prepared in example 1 using the 28000 MW hydroxyl terminated silicone identified in example 1 and methacryloxypropenyldimethylchlorosilane as the capping agent. This product was designated "28M:".

A methacryloxypropyl terminated silicone was prepared as in the previous paragraph except that the capping agent was methacryloxypropyldimethylchlorosilane. This product was designated "28M".

Formulations of the products 28M: and 28M were prepared and cured as in example 1. The results given in Table II demonstrates that for the 28M product, which has a saturated linking group, properties fall off when the thiol groups exceed the acrylic groups, whereas the 28M: product which has unsaturated linking groups, continues to show improved properties until the total number of ene groups has been exceeded. Thus, the formulation latitude of the (meth)acryloxyalkenylene functional silicones is greater than the (meth)acryloxyalkylene functional silicones exemplified in US 4,290,869 and 4,595,471. Moreover, at new stochiometric levels, where maximum cured properties are obtained in both formulations, significantly better properties are obtained using the (meth)acryloxyalkenylene functional siloxanes.

TABLE II

| Formulation | Acrylic Resin | ENE/THIOL RATIO | | Durometer | % Extractables | Surface Cure |
|---|---|---|---|---|---|---|
| | | Acrylic Only | Total 'ene | | | |
| N | 28M | 1/0 | 1/0 | 0 | 29.5 | Very tacky |
| O | 28M | 1/1 | 1/1 | 11 | 7.9 | Dry |
| P | 28M | 1/2 | 1/2 | 6 | 10.1 | Tacky |
| Q | 28M: | 1/0 | 1/0 | 1 | 19.5 | Very tacky |
| R | 28M: | 1/1 | 1/0.5 | 15 | 6.7 | Dry |
| S | 28M: | 1/2 | 1/1 | 18 | 7.3 | Dry |
| T | 28M: | 1/3 | 1/1.5 | 16 | 7.2 | Slight tack |

EXAMPLE 3

Mass loss plots were prepared from thermal gravimetric analysis data obtained between 40° C. and 700° C. at 10° C./min using both nitrogen and air purges on cured samples of several of the formulations described in example 1. Results at the 75% mass retention level show that as the amount of thiol increased, up to stoichiometric levels, the resistance to thermal degradation also increased. This result is totally contrary to expectations, based on the prior art, that increasing the number of monosulfide linkages would decrease the thermal resistance of the cured polymer.

A surprising improvement in thermal resistance was also observed when the saturated methacrylated thiol-ene formulation O was compared to the thiol free formulation N.

What is claimed is:

1. A composition cureable to a solid crosslinked polyorganosiloxane comprising:
   (a) an acrylic functional silicone prepolymer having a plurality of acrylic groups of the formula:

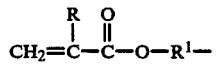

bound to silicon atoms thereof, where R is H or methyl, and $R^1$ is a divalent olefinically unsaturated hydrocarbon group,
   (b) a silicon prepolymer having a plurality of organothiol groups thereon, and
   (c) an effective amount thiol-ene cure catalyst.

2. A composition as in claim 1 wherein $R^1$ is a $C_3$-$C_{15}$ olefinically unsaturated hydrocarbon group.

3. A composition as in claim 1 wherein $R^1$ is propenylene.

4. A composition as in claim 1 wherein at least 20% on an equivalent basis of the organothiol functional silicone prepolymer comprises a compound of the formula:

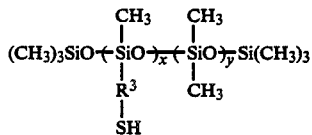

where $R^3$ is lower alkylene, x is 3–10, and y is 25–50.

5. A composition as in claim 4 wherein the organothiol functional silicone prepolymer further comprises a compound of the formula:

$$HS-(C_nH_{2n})-(SiO)_{\overline{m}}\overset{\underset{\displaystyle CH_3}{|}}{\underset{\underset{\displaystyle CH_3}{|}}{Si}}-(C_nH_{2n})-SH$$

where m is between 1 and 3, and n is 3–15.

6. A composition as in claim 1 wherein the thiol-ene cure catalyst is a free radical photoinitiator.

7. A composition as in claim 1 wherein the acrylic functional silicone prepolymer comprises a compound of the formula:

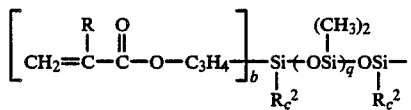

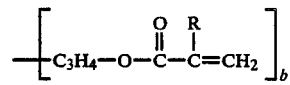

where b is 1 to 3, c is 0 to 2 and b+c=3, q is from 100–1500 and $R^2$ is hydrocarbyl or halohydrocarbyl.

8. A composition as in claim 7 wherein b is 1, c is 2 and $R^2$ is methyl.

9. A composition as in claim 4 wherein the acrylic functional silicone prepolymer is a compound of the formula:

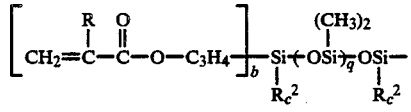

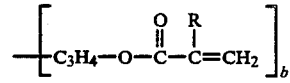

where $R^2$ is methyl, b is 1, c is 2 and q is from 100–1500.

10. A composition as in claim 9 wherein q is 250–750, x is 4–7, and y is 28–36.

11. A composition as in claim 10 wherein the number of ene groups and the number of thiol groups are approximately equal.

12. A composition as in claim 1 further comprising between 1% and 60% of a fumed silica filler.

13. A composition as in claim 12 wherein the silica is treated to render it hydrophobic.

14. A composition as in claim 3 wherein the propenylene groups are predominantly the exo isomer having the formula

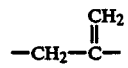

15. A composition as in claim 14 wherein the said exo isomer comprises at least 70% of the propenylene groups.

16. A composition as in claim 1 wherein the ratio of ene groups to thiol groups is between 0.5:1 and 5:1.

17. A composition as in claim 16 wherein the number of ene groups and the number of thiol groups are approximately equal.

18. A cured product of the composition of claim 1.

19. A cured product of the composition of claim 9.

* * * * *

UNITED STATES PATENT AND TRADEMARK OFFICE
CERTIFICATE OF CORRECTION

PATENT NO. : 4,952,711

DATED : August 28, 1990

INVENTOR(S) : Anthony F. Jacobine and Steven T. Nakos

It is certified that error appears in the above-identified patent and that said Letters Patent is hereby corrected as shown below:

Col. 2, ln. 62, in the formula: correct "$R_c{}^2$" to read -- $R^2{}_c$ --.

Col. 3, ln. 40, in the formula: correct "$R_c{}^2$" to read -- $R^2{}_c$ --.

Col. 5, ln. 53, change "acryloxypropeny" to correct spelling of -- acryloxypropenyl --.

Col. 5, ln. 61, delete "I7" after "product".

Col. 6, ln. 15, change "60.C" to correctly read "60°C".

Col. 8, ln. 30, in the formula: correct "$R_c{}^2$" to read -- $R^2{}_c$ --.

Col. 8, ln. 48, in the formula: correct "$R_c{}^2$" to read -- $R^2{}_c$ --.

Signed and Sealed this

Twenty-seventh Day of August, 1991

Attest:

HARRY F. MANBECK, JR.

*Attesting Officer*  *Commissioner of Patents and Trademarks*